United States Patent [19]

Coppa et al.

[11] 3,898,545

[45] Aug. 5, 1975

[54] MOTOR CONTROL CIRCUIT

[75] Inventors: Paul L. Coppa, Norristown; Louis G. Orsatti, Philadelphia, both of Pa.

[73] Assignee: Mohawk Data Sciences Corporation, Utica, N.Y.

[22] Filed: May 25, 1973

[21] Appl. No.: 363,908

[52] U.S. Cl. ................................ 318/313; 318/327
[51] Int. Cl. ............................................. H02p 5/06
[58] Field of Search .......... 318/314, 318, 326, 327, 318/313

[56] References Cited
UNITED STATES PATENTS

| | | | |
|---|---|---|---|
| 3,514,679 | 5/1970 | Larsen | 318/313 |
| 3,581,176 | 5/1971 | Bigg | 318/327 |
| 3,582,699 | 6/1971 | Badessa | 318/327 |
| 3,634,745 | 1/1972 | Agin | 318/327 |

OTHER PUBLICATIONS

Brownback, D. E., "D.C. Motor Speed Control", IBM Technical Disclosure Bulletin, Vol. 13, No. 1, June 1970.

Primary Examiner—Robert K. Schaefer
Assistant Examiner—John J. Feldhaus
Attorney, Agent, or Firm—Robert R. Hubbard

[57] ABSTRACT

A motor control circuit for maintaining a d-c electric motor at a constant speed, including a speed sensing means connected to the d-c electric motor to generate motor pulses whose duration is inversely proportional to the speed of the d-c electric motor, a bistable means for providing a continuous drive signal to the d-c electric motor and responsive to the application of the motor pulses and to the application of reference pulses generated by the motor pulses. The bistable means drives the d-c electric motor as long as the fixed duration of the reference pulses is shorter than the duration of the motor pulses being generated due to the rotation of the armature of the electric motor. Delay means are provided in the circuit to prevent ambiguity at the bistable means due to the simultaneous application of both the motor pulses and reference pulses to the bistable means.

6 Claims, 4 Drawing Figures

MOTOR CONTROL CIRCUIT

BACKGROUND OF THE INVENTION

In the prior art various motor control circuits have been disclosed which provide rotational speed control of a d-c electric motor. Such prior art motor control circuits, however, have not used a bistable means to provide a continuous drive signal to the d-c motor as long as a reference pulse ends before the start of a motor pulse, the latter pulse having a duration dependent on the speed of the electric motor and the reference pulse having a constant duration.

It is an object of the present invention to provide a motor control circuit which provides a continuous drive to a d-c electric motor when the d-c motor is producing motor pulses having a longer duration than reference pulses whose duration is fixed and which are produced by the motor pulses.

It is another object of the present invention to provide a motor control circuit which will maintain a constant speed for a d-c electric motor, with the speed being determined by the duration of reference pulses from a retriggerable one-shot.

It is still another object of the present invention to provide means to eliminate the simultaneous occurrence of pulses at two inputs to a bistable device which is used to drive a d-c electric motor.

SUMMARY OF THE INVENTION

The above objects are achieved in one embodiment of the invention by providing an optical tachometer connected to the d-c electric motor to generate motor pulses whose duration is inversely proportional to the speed of the motor, a D-type flip-flop having its clock input directly connected to the output from the optical tachometer and having its data input connected to the tach output through a retriggerable one-shot and an edge-delay circuit. The D-type flip-flop compares the duration between positive-going leading edges of the train of tach pulses (the tach period) against a fixed reference period established by the retriggerable one-shot. When the tach period is shorter than a reference period from the one-shot, it indicates that the motor velocity is above a desired norm and the motor drive from the flip-flop cuts off to allow the motor to coast, whereupon forces of friction and drive load slow down the motor. When the tach period is longer than the reference period from the one-shot, it indicates that the motor velocity is below the desired norm and a constant drive signal is applied from the flip-flop to the motor.

In accordance with another embodiment a tachometer output is connected to the inputs of a first one-shot multivibrator and a second retriggerable one-shot multivibrator, the latter of which establishes the reference period. The 1-bit output of the first one-shot is directly connected to one input of an AND gate and the 1-bit output of the retriggerable one-shot is connected through an edge-delay circuit to the other input of the AND gate. The output of the AND gate is connected to the reset input of an R-S flip-flop and the 0-bit output of the retriggerable one-shot is connected to the set input of the R-S flip-flop. The output of the flip-flop is used to turn the motor drive circuit on and off in essentially the same manner as the D-type flip-flop output is employed in the previously suggested embodiment.

The main difference in the operation of the two suggested embodiments is that the motor control flip-flop in the latter switches the motor drive circuit on at the instant the retriggerable one-shot times out (which event indicates that the tach period exceeds the duration of the one-shot reference pulse). In the former embodiment the motor drive is not initiated until commencement of the next tach half-cycle following time out of the one-shot.

DESCRIPTION OF THE PREFERRED EMBODIMENT

Figure 1:
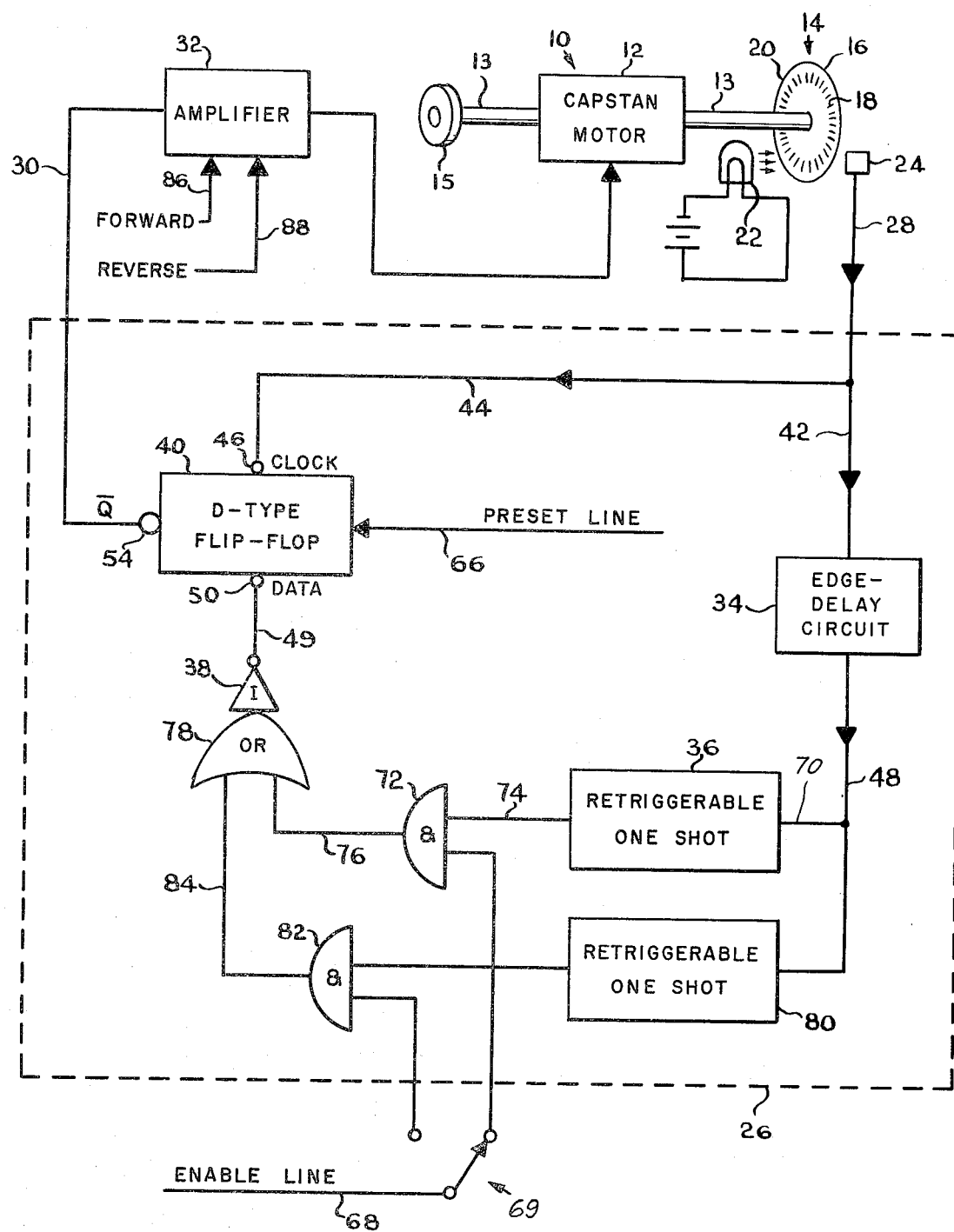
FIG. 1 is a diagrammatical view having elevational sections therein of a motor control circuit of the present invention.

A motor control circuit 10 which is used to accurately drive a d-c capstan motor 12 is shown in FIG. 1. The capstan motor 12 has a seven-slot armature and a two-pole permanent magnet stator and operates at 10 volts. The capstan motor 12 has an armature 13 to an end of which an optical tachometer 14 is rigidly connected. A capstan wheel 15 is connected at the opposite end of the armature 13. The optical tachometer 14 uses a 2-inch diameter disc 16 which has 250 0.15-inch long tapered slots 18 which start at 0.03 inches from the edge of the disc 16. The slots 18 allow light pulses to pass from a light-emitting diode 22 to a photo transistor 24. The disc 16 may be made of metal such as brass and the slots may be 0.0075 inches wide at the point where light goes through them with 0.015 inches of metal between them. The slots may be formed by chemical milling in a metal disc. These light pulses produce motor or slot pulses in the photo transistor assembly 24, the duration of the motor pulses being used to sense the speed of the capstan motor 12. A pulse shaping circuit is also located in photo transistor assembly 24 to square off the transitions in the motor pulses. The photo transistor aperture in the photo transistor assembly is 0.09 inches long and 0.017 inches wide so that it is wider than the slots 18 in disc 16.

The duration of the motor pulses over line 28 is sensed by logic circuit 26 and a motor drive signal is passed over line 30 from the logic circuit 26 when the duration of the motor pulses is greater than a selected duration. The feedback drive signal from the logic circuit 26 is amplified by an amplifier circuit 32 prior to being applied to the capstan motor 12. The amplifier circuit 32 consists of a preamplifier and a bipolar power amplifier. The bipolar power amplifier operates at class C during the start-up and constant velocity of capstan motor 12, and operates class A during the stopping of capstan motor 12. The capstan motor 12 will turn in a forward direction when negative 10-volt d-c drive pulses are applied to it and will turn in a reverse direction when positive 10-volt d-c drive pulses are applied to it.

The logic circuit 26 is composed of an edge-delay circuit 34, a retriggerable one-shot 36, an inverter 38 and a D-type flip-flop 40. The motor pulses from photo transistor assembly 24 are transmitted over a line 42 to the edge-delay circuit 34 (which delays positive-going edges only) and over a line 44 to the clock input 46 of the D-type flip-flop 40. The pulse train on line 28 is a bi-level voltage signal which exists at a low level when photo transistor 24 is illuminated through a slot 18 by radiation from source 22 and shifts to a high level when radiation is cut off. A delayed electrical reference pulse passes out of edge-delay circuit 34 over line 48 to the input 70 of retriggerable one-shot 36. The retriggerable one-shot 36 fires in response to a positive-going edge in the delayed response pulse signal on line 48. The one-shot is a retriggerable monostable multivibrator which recycles each time a new firing signal is applied to it. The output thus does not "time out" (shift low) until the interval between positive transitions at its input is longer than its firing time (time-out period). A reference pulse from the retriggerable one-shot 36 is inverted as to the sign of its voltage by inverter 38 and the inverted reference pulse is passed over a line 49 to the data input 50 of the D-type flip-flop 40. When the signal level at data input 50 is low at the time the clock input 46 goes high, the $\overline{Q}$ output 54 of the D-type flip-flop 40 shifts in the positive direction (or stays high if it is already in a high state). The $\overline{Q}$ output 54 of the flip-flop 40 shifts back to the low state the next time a positive-going edge occurs at clock input 46 at a time when data input 50 is receiving a high voltage level signal. Amplifier 32 then supplies a −10 volt drive signal to motor 12 when the flip-flop output on line 30 is at the low level and cuts off the motor drive voltage when the $\overline{Q}$ output of flip-flop 40 is high.

The edge-delay circuit 34 delays the positive-going slot pulses by a time such as one microsecond, to prevent a reference pulse from occurring at the data input 50 at the same instant that a clock transition is presented to input 46 of the flip-flop 40, thus allowing time for the flip-flop to reliably sample the state of the signal on line 49.

The retriggerable one-shot 36 has a firing time which is selected to be one microsecond less than the duration of the desired period of the waveform generated by the optical tachometer 14. In one embodiment, the firing time of the retriggerable one-shot 36 was selected to be 221 microseconds for capstan motor 12 to turn at 1,080 revolutions per minute. In this instance a 2-inch diameter disc 14 having slots 18 of 0.0075 inches in width and 0.893 inches from the center of the disc 14 was used. When a capstan 15 rotates at 1,080 revolutions per minute it will move magnetic tape in a tape cartridge at 30 inches per second when the capstan 15 has a diameter of 0.68 inches. The magnetic tape cartridge may be of the type which has a single magnetic tape drive wheel which will wind magnetic tape on either of two spools in a tape cartridge. The capstan 15 abuts such a magnetic tape drive wheel with magnetic tape being between the two wheels.

A preset line 66 is used to pass a preset signal into the D-type flip-flop 40 during the start-up of capstan motor 12 to force the output from flip-flop 40 to the low state to present a continuous drive signal to the motor. Once the motor has been started the preset signal is dropped and the motor velocity is controlled by the circuit 26.

An enable line 68 is connected through a switch 69 to one input of an AND gate 72 to allow 221 microsecond reference pulses which are emitted from retriggerable one-shot 36 to be passed successively over leads 74 and 76, through OR gate 78 and inverter 38 to the data input 50 of the flip-flop 40. In order to cause the capstan 15 to rotate at a different controlled velocity such as 3,240 revolutions per minute (producing a magnetic tape at 90 inches per minute), a second retriggerable one-shot 80 is provided. The retriggerable one-shot 80 emits reference pulses which have a 73.6 microsecond firing time which are inputted to the data input 50 when switch 70 is set to enable AND gate 82. The 73.6 microsecond reference pulses are then successively passed to input 50 through AND gate 82, line 84, OR 78 and inverter 38. The logic circuit 26 thus allows selection of two different controlled capstan speeds.

The amplifier 32 will amplify a zero volt output of the D-type flip-flop 40 to −10 volts to drive the capstan motor 12 in a forward direction when a forward-select signal is applied to line 86. By alternately applying a reverse-select signal to line 88, the amplifier 32 will amplify and invert a zero volt output of the D-type flip-flop 40 and apply a +10 volt drive signal to the motor 12 which will then be driven in a reverse direction.

Figure 2:
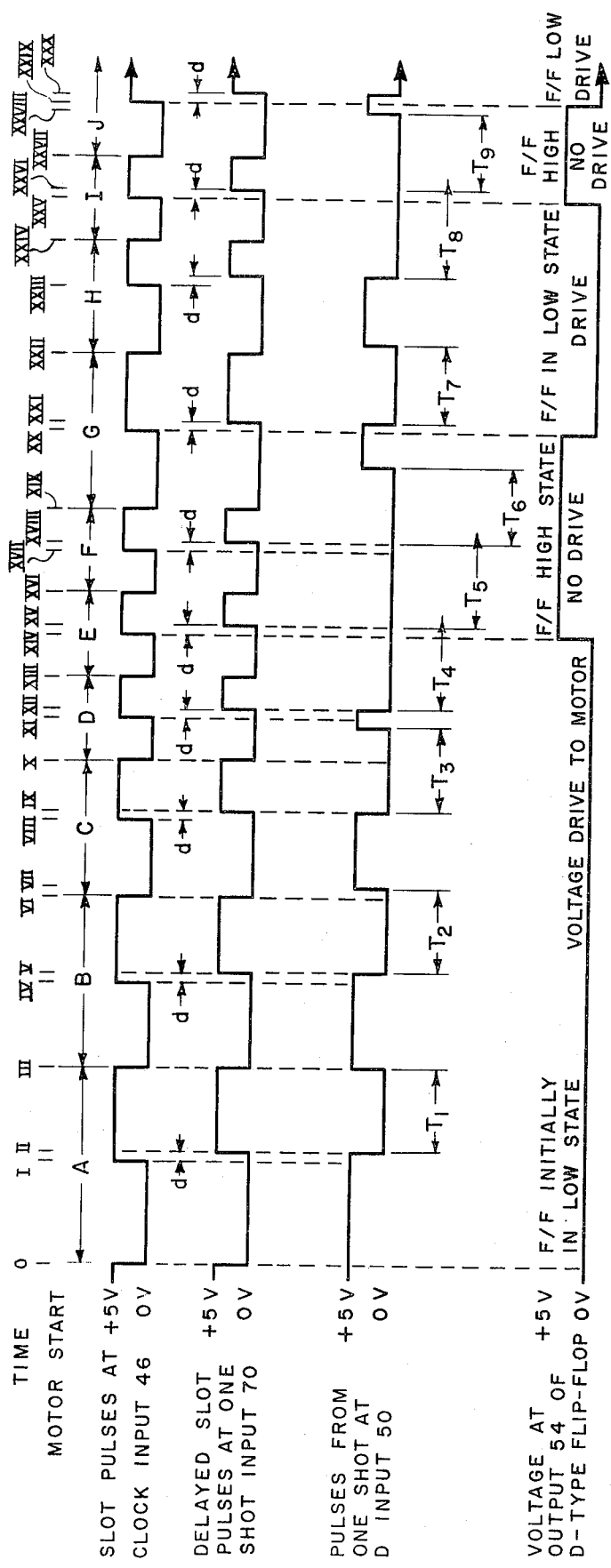
FIG. 2 is a timing diagram of the pulses which occur during the operation of the motor control circuit of FIG. 1.

FIG. 2 shows the operating pulses of the motor control circuit 10 of FIG. 1. The times 0 to XXX are used to designate instances during the operation of motor control circuit 10 of FIG. 1, namely, the start-up of capstan motor 12, the overspeeding and turning off of capstan motor 12, the slowing down and turning on of capstan motor 12 and the continuous on and off regulation of the speed of capstan motor 12 near 1,080 revolutions per minute. The top row of pulses are the motor pulses emitted from photo transistor 24 of FIG. 1. The second row of pulses are the delayed motor pulses coming from the delay circuit 34 of FIG. 1, the third row of pulses are the reference pulses produced by the retriggerable one-shot 36 of FIG. 1 and the fourth row of pulses are the drive or no-drive signals at the inverted output 54 of the D-type flip-flop 40 of FIG. 1 which are amplified and sent to capstan motor 12 to drive or not drive capstan motor 12.

Before time 0 the D-type flip-flop 40 is set to a low state using preset line 66 to start the turning of capstan motor 12, and an enable signal is applied to line 68 to activate the motor control circuit 10. The armature 13 and capstan wheel 15 of capstan motor 12 start to rotate so as to drive magnetic tape past a transducer station (not shown). The magnetic tape is not read or recorded on during the start-up period to allow the capstan motor to reach approximately 1,080 revolutions per minute. At time 0 the capstan motor 12 is still accelerating but the logic circuit 26 is nearly ready to be activated. Between times 0 and I the zero volt of tachometer output cycle A is formed by photo transistor 24 as a result of a light pulse being passed through a slot of disc 14. A +5 volt portion of the A cycle occurs between times I and III due to a strip of metal adjacent the slot in disc 16. At time I the leading edge of the positive portion of the motor pulse A appears at the clock input 46 of D-type flip-flop 40, but since at this time I the data input 50 is at zero volts, the D-type flip-flop 40 stays in a low state and the capstan motor 12 continues to accelerate.

Similar to the operation of the logic control circuit 26 during tach cycle A, the logic circuit 26 will continue to drive the capstan motor 12 during cycles B, C and D since the duration of times between the positively going edges of these cycles is greater than the sum of the edge delay of circuit 34 plus the firing time of the retriggerable one-shot 36.

Since the retriggerable one-shot 36 is still firing at time XIV, at which time a positively increasing edge of tach cycle E appears at the clock input 46 of the D-type flip-flop 40, the D-type flip-flop 40 will switch from a low state to a high state and the capstan motor 12 will cease being driven at time XIV. This switching is due to the fact that at time XIV the capstan motor 12 is turning at a faster rate of speed than 1,080 revolutions per minute. This is evidenced by the fact that the time between the firing of the retriggerable one-shot at time XII and the positive-going edge of tach cycle E occurring at time XIV is less than the single-shot period of 221 microseconds. Similarly the D-type flip-flop 40 stays in a high state at time XVII at the positive-going edge of tach cycle F and the capstan motor 12 continues to coast at time XVII, since the duration of time between the beginning of firing of the retriggerable one-shot at time XV and the occurrence of the positive leading edge of tach cycle F is less than the duration of single-shot period $T_5$.

At time XVIII the period $T_6$ of retriggerable one-shot 36 is initiated by the delayed positive-going edge of tach cycle F. This firing time $T_6$ times out before the beginning at time XX of the positive-going edge of tach cycle G, indicating that the capstan motor 12 is now turning at a slower rate than 1,080 revolutions per minute. At time XX the D-type flip-flop 40 is therefore placed in a low state and the capstan motor 12 is again driven since the data input 50 was at +5 volts at this time. Since the duration of time between the delayed positive-going edge of tach cycle G and the undelayed positive-going edge of the tach cycle H is greater than 221 microseconds, the D-type flip-flop 40 stays in a low state during cycle H and the capstan motor 12 continues to be driven at time XXIII.

During tach cycle I the D-type flip-flop 40 again switches to a high state as described for the switching during cycle E. The capstan motor 12 ceases to be driven and begins to again slow down, since the one-shot time $T_8$ is greater than the time between the delayed positive-going edge of tach cycle H and the non-delayed positive-going edge of cycle I.

During cycle J the capstan motor 12 is switched back on since the duration of time between the delayed positive-going edge of tach cycle I and the non-delayed positive-going edge of cycle J is greater than one-shot period $T_9$. The motor control circuit 26 of FIG. 1 will maintain the period between the positive-going edges of successive tach cycles at very close to 220 microseconds to accurately control the speed of the capstan motor 12.

Figure 3:
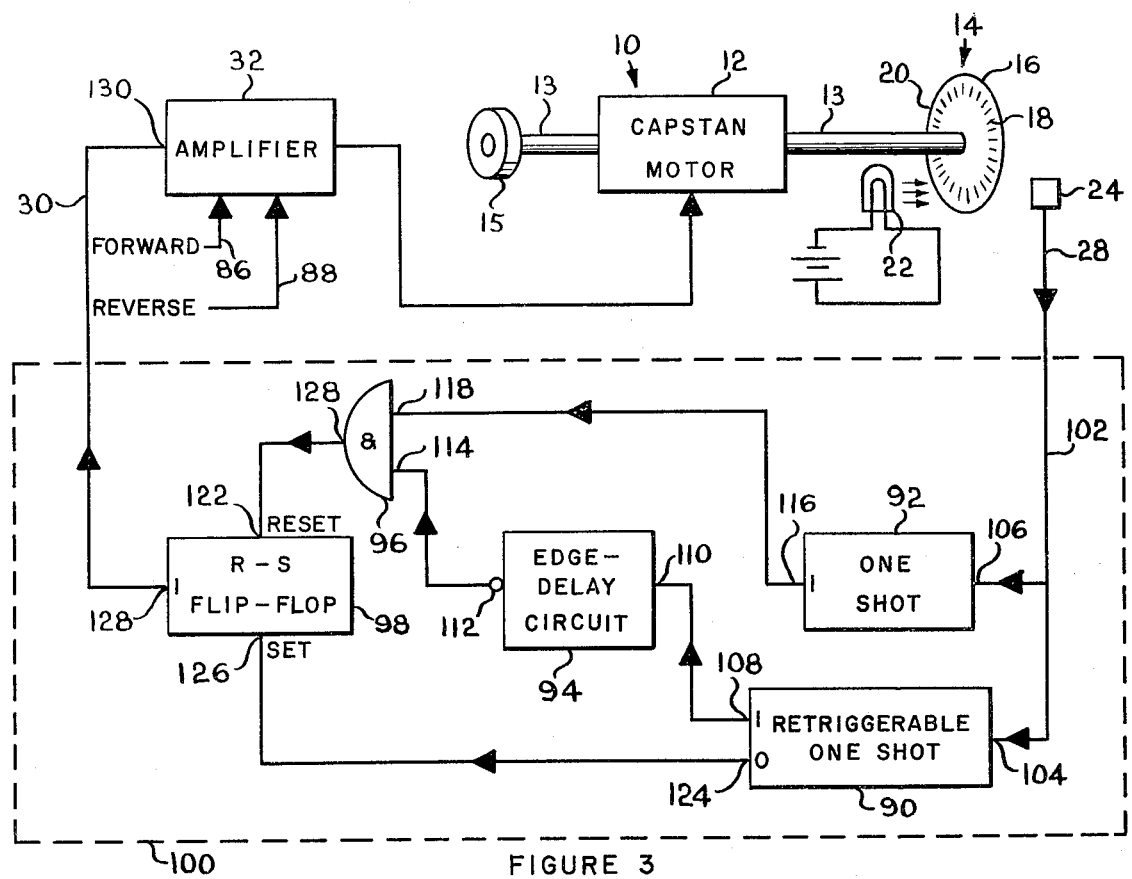
FIG. 3 is a diagrammatical view having elevational sections therein of another motor control circuit of the present invention.

As shown in FIG. 3, an alternative embodiment of the invention includes a retriggerable one-shot 90, a non-retriggerable one-shot 92, an edge-delay circuit 94, an AND gate 96 and an R-S flip-flop 98 combined to provide a constant velocity control circuit 100. The optical tachometer 14, capstan motor 12 and amplifier 32 are identical with the apparatus of FIG. 1.

A line 102 applies tachometer pulses simultaneously to the input terminals 104 and 106 of the one-shots 90 and 92. Output terminal 108 of one-shot 90 is connected to the input terminal 110 of edge-delay circuit 94 identical to the circuit 34 of FIG. 1. The output terminal 112 of the edge-delay circuit 94 is connected to one input terminal 114 of an AND gate 96 and the output terminal 116 of one-shot 92 is connected to the other input terminal 118 of AND gate 96. The output terminal 128 of AND gate 96 is connected to the reset terminal 122 of R-S flip-flop 98. Output terminal 124 of one-shot 90, which provides an output complementary to that generated at 108, is connected to the set terminal 126 of R-S flip-flop 98 and the 1-bit output terminal 128 of R-S flip-flop 98 is connected to the input terminal 130 of the motor drive amplifier 32.

One-shot multivibrator 92 may be of conventional construction and operates to generate a narrow output pulse in response to a positive-going transition at its input. The R-S flip-flop is also of conventional construction and operates such that output 128 switches high in response to a positive-going transition occurring at set input 126 and switches low in response to a positive-going transition occurring at reset input 122. One-shot 90 is identical to one-shot 80 described previously.

Figure 4:
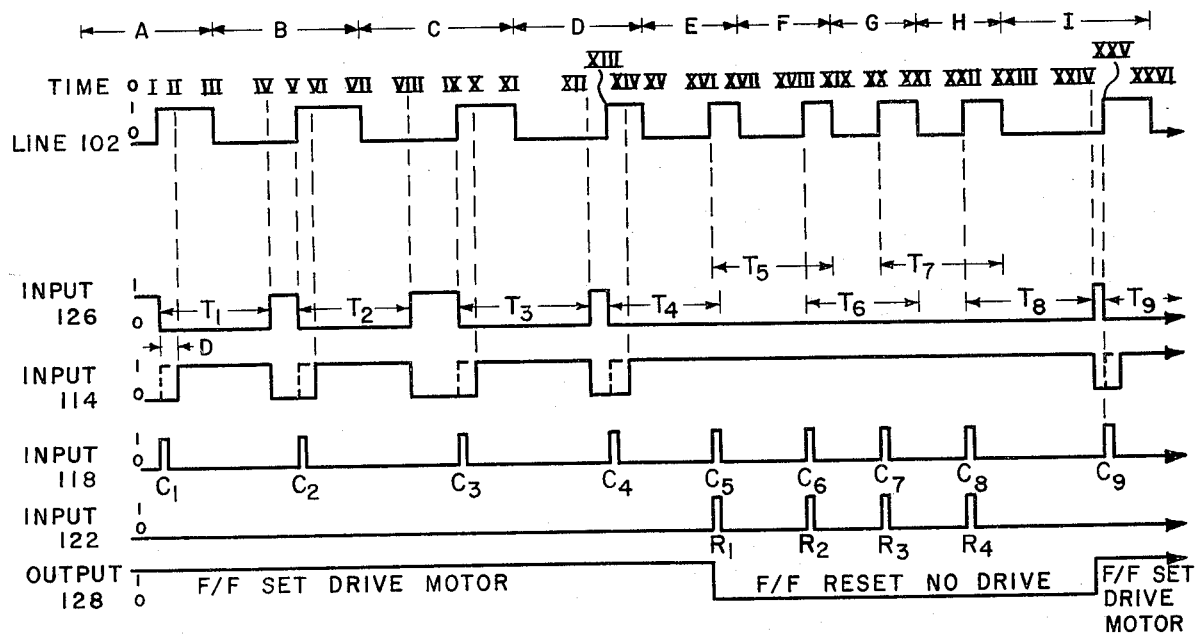
FIG. 4 is a timing diagram of the pulses which occur during the operation of the motor control circuit of FIG. 3.

FIG. 4 shows the pulses generated during the operation of the logic control circuit 100 of FIG. 3. The top row of pulses are the tachometer pulses generated by optical tachometer 14 and applied to input terminals 104 and 106 of one-shot devices 90 and 92. The second row of pulses are the reference pulses generated at output 124 of retriggerable one-shot 90 and applied to set input 126 of flip-flop 98. The third row of pulses are delayed complementary reference pulses from edge-delay circuit 94. The fourth row of pulses are those generated by the one-shot 92. The fifth row of pulses are those emitted from AND gate 96 and applied to reset terminal 122 of R-S flip-flop 98. The sixth row of pulses is the drive or no-drive signal emitted by R-S flip-flop 98.

At time I of FIG. 4 a positive-going edge of tach cycle A is applied on line 102 to retriggerable one-shot 90 and one-shot 92, causing both to fire. At time I a reference pulse $T_1$ generated by one-shot 90 is applied to the set input 126 of flip-flop 98 and since flip-flop 98 was in a set state immediately before time I, it remains in the set state. At time I a pulse $C_1$ is emitted from one-shot 92 and applied to AND gate 96, but the delayed complementary reference pulse generated by edge-delay circuit 94 is still low so that AND 96 is not operated. R-S flip-flop 98 thus remains in the set state with its output high. By the time II when output 112 does go high pulse $C_1$ has terminated so that flip-flop 98 stays set.

At time IV during tach cycle B reference pulse $T_1$ from retriggerable one-shot 90 ends and a positive transition is applied to set input 126 of flip-flop 98. Since the latter is still set, nothing changes.

One-shot pulses $C_2$, $C_3$ and $C_4$ generated in response to the positive-going edge portions of tach cycles B, C and D respectively, are, like pulse $C_1$, unable to cause resetting of flip-flop 98 since the reference one-shot pulses $T_1$, $T_2$ and $T_3$, respectively, had previously timed out during the same cycle. The flip-flop thus stays set into tach cycle E.

However, by the time pulse $C_5$ is generated at time XVI the speed of the motor has increased to the point where the duration of a tach cycle, as measured between successive positive-going transitions in the tach output, is shorter than the reference period generated by the retriggerable one-shot. Thus at time XVI when pulse $C_5$ comes up output 112 from edge-delay circuit 94 is still high (one-shot reference pulse $T_4$ not having timed out) and AND 96 is enabled. The resultant output from AND 96 resets flip-flop 98, whereupon output 128 shifts low and the motor drive signal is terminated.

At times XVIII, XX and XXII during tach cycles F, G and H, respectively, each of pulses $C_6$, $C_7$ and $C_8$ similarly encounter AND 96 in a conditioned state due to the high level at the output of delay circuit 94 and AND 96 accordingly applies reset pulses to input 122 of flip-flop 98. The latter therefore remains in the reset or "no drive" state and motor 12 continues to coast.

During tach cycle I the motor speed has decreased to the point where one-shot reference pulse $T_8$ times out at time XXIV prior to occurrence of the next positive-going tach signal at time XXV. The positive shift at one-shot output 124 thus sets flip-flop 98 and the drive signal is reapplied to motor 12. When one-shot pulse $C_9$ occurs at time XXV the edge-delay circuit 94 keeps input 114 to AND 96 low enough to inhibit generation of a flip-flop reset pulse.

Control circuit 100 thus effects velocity feedback control in a manner very similar to circuit 26 of FIG. 1. The principal difference between operation of the two circuits lies in the fact that circuit 100 operates instantaneously to reapply the motor drive signal upon timing out of the reference one-shot 90. The timing out of the reference one-shot 36 or 80 of circuit 26 does not itself operate to reapply the motor drive. The latter is not effected until occurrence of the next-ensuing positive-going transition in the tach output signal. In instances where a suddenly applied capstan motor load causes an appreciable sudden decrease in the motor velocity the feedback response of circuit 100 will be somewhat better than that of circuit 26.

We claim:

1. A motor control circuit for maintaining an armature of a d-c electric motor at constant speed, comprising:

speed sensing means responsive to the armature rotation for producing a motor signal, the period of which is inversely proportional to the armature speed;

a time delay circuit which delays the leading edge of the motor signal in each motor signal period;

a retriggerable one-shot circuit responsive to the delayed leading edges of the motor signal to produce a pulse of a fixed reference width only during those motor signal periods which are greater than the reference width; and a bistable circuit having input connections to receive said motor signal and said reference pulses and being set to a first state for applying a continuous drive signal to said motor so long as said one-shot circuit produces reference pulses and to be set to its other state during motor signal periods which are shorter than the reference width.

2. The motor control circuit of claim 1 wherein the time delay circuit is an edge-delay circuit which provides about a one microsecond delay of the leading edge of said motor signal in each signal period.

3. The motor control circuit of claim 1 wherein the speed sensing means is an optical tachometer.

4. The motor control circuit of claim 1 wherein the bistable drive means is a D-type flip-flop having D and clock inputs, corresponding to said input connections, and connected to receive said reference pulses and motor signal, respectively.

5. A motor control circuit for maintaining an armature of a d-c electric motor at constant speed, comprising:

speed sensing means responsive to the armature rotation for producing a motor signal, the period of which is inversely proportional to the armature speed;

a retriggerable one-shot circuit responsive to said motor signal to produce a pulse of a fixed reference width during only those motor signal periods which are greater than the reference width;

a time delay circuit for delaying the leading edges of the reference pulses;

a sampling pulse generator responsive to said motor signal to produce during each motor signal period a sampling pulse;

a circuit for producing a reset pulse in response to the coincidence of a reference pulse and a sampling pulse, the sampling pulse width being shorter than the delay time of said delay circuit, whereby said coincidence occurs only when the motor signal period is less than the reference width; and a bistable circuit having input connections to receive said reference pulses and said reset pulses and being set to a first state for applying a continuous drive signal to said motor so long as said retriggerable one-shot circuit produces reference pulses and to be set to its other state during motor signal periods in which said reset pulses occur.

6. The motor control circuit of claim 5 wherein the bistable drive means is an R-S flip-flop, having reset and set inputs, corresponding to said input connections, and connected to receive said reset and reference pulses, respectively.

* * * * *